United States Patent [19]

Pruitt

[11] 4,408,267

[45] Oct. 4, 1983

[54] DC-TO-DC SWITCHING CONVERTERS

[75] Inventor: Duard L. Pruitt, Cinnaminson, N.J.

[73] Assignee: RCA Corporation, New York, N.Y.

[21] Appl. No.: 416,704

[22] Filed: Sep. 10, 1982

Related U.S. Application Data

[63] Continuation of Ser. No. 223,495, Jan. 8, 1981, abandoned.

[51] Int. Cl.³ .......................................... H02M 3/335
[52] U.S. Cl. ......................................... 363/17; 363/25
[58] Field of Search ............................. 363/17, 20–21, 363/24–26, 97–98, 131–134; 323/222, 271, 272, 282

[56] References Cited

U.S. PATENT DOCUMENTS

| | | | |
|---|---|---|---|
| 3,443,194 | 5/1969 | Cielo | 363/20 |
| 3,443,195 | 5/1969 | Hoffman, Jr. et al. | 363/20 |
| 3,663,940 | 5/1972 | Schwarz | 363/28 |
| 3,694,726 | 9/1972 | Cielo et al. | 363/25 |
| 3,740,639 | 6/1973 | Easter | 363/21 |
| 3,846,691 | 11/1974 | Higgins | 363/25 |

OTHER PUBLICATIONS

"Comparison of Multiple-Output DC-to-DC Converter Using Cross-Regulation", H. Matsuo, Power Conversion International, Nov./Dec. 1980, pp. 14–37.

"A Boost Regulator With a New Energy-Transfer Principle", A. H. Weinberg, Proceedings of the Spacecraft Power Conversion Electronics Seminar, Sep. 1974, ESRO Publication SP-103, pp. 115–122.

"Switching Topologies–Make Them Work for You!", R. Severns, Intersil Application Bulletin, AO35, 1980, pp. 1, 13, 14, 18, 19, 30–32.

"Power Processing Module for Military Digital Equipment Power Subsystem", Biess, Cronin & Dudley, IEEE Power Electronics Specialists Conference Record, Jun. 1977, pp. 200–206.

Primary Examiner—William M. Shoop
Assistant Examiner—Peter S. Wong
Attorney, Agent, or Firm—Joseph S. Tripoli; Robert L. Troike; Allen LeRoy Limberg

[57] ABSTRACT

DC-to-dc switching converters that deliver non-pulsating output current use a conventional transformer and a flyback transformer with primary windings recurrently connected in series to the primary d-c energy source and with secondary windings alternately connected to the output load.

8 Claims, 11 Drawing Figures

DC-TO-DC SWITCHING CONVERTERS

The Government has rights in this invention pursuant to Contract No. N00024-79-C-5714 with the Department of the Navy.

This is a continuation of application Ser. No. 223,495, filed Jan. 8, 1981, now abandoned.

The present invention relates to direct-current to direct-current switching converters and, more particularly, to a type of d-c to d-c switching converter as will supply a substantially non-pulsating flow of output current without the need for a smoothing filter in its output circuit.

The invention is embodied in a converter wherein a conventional transformer primary winding is arranged for push-pull conduction of current by connection in a full-bridge-amplifier configuration. Flyback transformer primary windings are arranged to conduct these push-pull currents. Output currents from the conventional and flyback transformer secondary windings are combined to supply the converter load a load current with reduced ripple.

Figure 1:
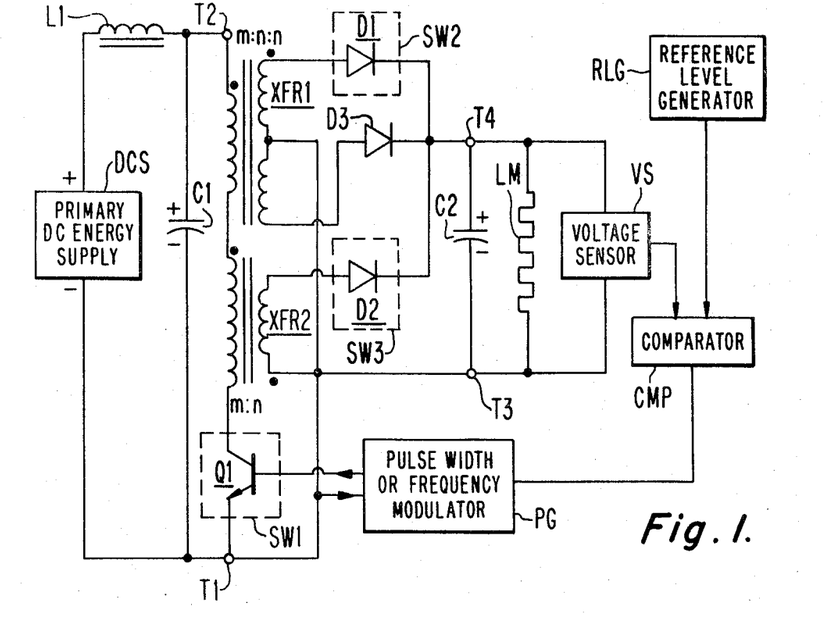
FIG. 1 is a schematic diagram of a d-c to d-c switching converter, the description of which is useful in understanding the present invention, shown in combination with the elements required for a switching voltage regulator.

In FIG. 1 a primary d-c energy supply DCS applies relatively negative and relatively positive operating potentials to a first terminal T1 and to a second terminal T2, respectively, the input terminals of a dc-to-dc switching converter having a third terminal T3 and a fourth terminal T4 as its output terminals. In the particular arrangement shown, terminal T3 is connected by direct connection to terminal T1, so input voltage at terminal T2 and output voltage at terminal T4 are referred to the same common voltage at terminals T1 and T3. The primary d-c energy supply DCS might connect directly between terminals T1 and T2. However, the input current demand of the dc-to-dc switching converter is pulsating in nature; and connection via a smoothing filter such as series choke L1 and shunt capacitor C1 places more constant loading on the primary d-c energy supply, which generally aids regulation of the converter output voltage between terminals T3 and T4.

First switching means SW1 recurrently connects the primary windings of a first transformer XFR1 and a second transformer XFR2 in series between terminals T1 and T2. This first switching means SW1 is shown, by way of example, as comprising an NPN transistor Q1 with emitter connected at terminal T1 and with collector connected via the serially connected primary windings of XFR2 and XFR1 (in that order) to terminal T2. The order of arrangement of the primary windings of XFR1 and XFR2 can be reversed without affecting circuit operation; and the location of switching means SW1 in its series connection with those windings is, of course, chosen for convenience in the application of signals between the emitter and base electrodes of Q1 to control the conduction between its collector and emitter electrodes. (Were the output circuit between terminals T3 and T4 referred in potential to terminal T2 rather than T1, for example, it would be more convenient to use as first switching means a PNP transistor with emitter at terminal T2 and collector connected to terminal T1 via the primary windings of transformers XFR1 and XFR2.)

Transformer XFR1 has a secondary winding with a first end continuously connected to terminal T3 and with a second end selectively connected to terminal T4 by a second switching means SW2, which conducts essentially simultaneously with switch means SW1. The simplest form, probably, switching means SW2 can take is a diode D1, poled to be unilaterally conductive responsive to the secondary winding current of XFR1, induced in response to the flow of current through the primary winding of XFR1 when switching means SW1 is conductive. That is, transformer XFR1 exhibits normal transformer action without storing energy, responding to the flow of current through switching means SW1 to deliver current to load means LM and to smoothing capacitor C2.

Transformer XFR2, on the other hand, is a flyback transformer operating to build up the field surrounding its primary winding, so as to store energy, during the conduction of switching means SW1. To further this build-up, the secondary winding of XFR2 has its first end selectively connected by third switching means SW3 to terminal T4 only at such times as switching means SW1 is non-conductive, the second end of this winding being continuously connected at terminal T3. The simplest form, probably, switching means SW3 can take is a diode D2, poled to be unilaterally conductive only when the field in the primary winding of flyback transformer XFR2 is collapsing.

Output current is, then, continuously supplied from terminal T4, via normal transformer action of XFR1 and conduction of switching means SW2 during conduction of switching means SW1 to connect the primary windings of XFR1 and XFR2 between terminals T1 and T2, and via flyback transformer action of XFR2 and conduction of switching means SW3 when switching means SW1 is no longer conductive. A feature of the circuitry thus far described is that the series connection of the primary windings of transformers XFR1 and XFR2 assures that the current flows in their primary windings track and so, supposing their primary-to-secondary-winding turns ratios to be the same, by Lenz's Law the alternate current flows from their secondary windings assure a substantially constant flow of current to the load means LM. This is important since it reduces the ripple content of the power delivered to the load means LM and makes the task of regulating the voltage across or current through load means LM considerably less difficult. This is particularly so where switching regulation is employed, controlling the mark to space ratio of the selective connections afforded by conduction of switching means SW1, SW2 and SW3. Tight regulation can be achieved with less open-loop gain in the feedback loop controlling the switching of switching means SW1 (and thus the switching of switching means SW2 and SW3) than might otherwise be necessary; and this makes it easier to insure that the loop is stabilized against undesirable tendencies towards self-oscillation, particularly where load means LM presents varying load conditions.

Magnetizing energy in transformer XFR1 may, in the interest of converter efficiency be recovered as shown in FIG. 1. That is, by including its secondary winding as half of a longer winding extended from the second end of the secondary winding, with a diode D3 poled to conduct current to terminal T4 during the collapse of magnetic fields in this transformer. Transformer XFR1 may be replaced with a transformer that, instead of or as well as having a longer winding that includes its secondary winding, has a tertiary winding bifilar wound with its primary winding and selectively connected by third switch means across the primary energy supply DCS itself or across capacitor C1. Transformer XFR2 may be modified to use a tertiary winding bifilar wound with its primary winding and selectively connected across the primary energy supply DCS or capacitor C1 to recover the magnetizing energy in its primary winding leakage inductance, though to make this work well the designer must be sure that the tertiary winding reverse-EMF exceeds the voltage the primary energy supply impresses between terminals T1 and T2. In applications where the energy recovered by either of these two methods is considered to be insignificant, power-dissipative "snubber" circuitry may be employed—e.g., a series connection of resistor and d-c blocking capacitor can be connected across the serially connected primary windings of the two transformers. Resistors may be placed across the transformer secondary windings to damp ringing, as well.

The conduction of switching means SW1 can be controlled in a variety of ways. FIG. 1 shows a voltage sensor VS arranged to respond to the d-c to d-c switching converter output voltage between terminals T3 and T4 for controlling the duration or repetition rate (or both) of pulses applied by a pulse generator PG to the base of transistor Q1 to switch Q1 into conduction. That is, more particularly, pulse generator PG may be either a pulse width modulator or a pulse frequency modulator. Such an arrangement forms a switching voltage regulator. As the sensed voltage increases above a prescribed reference voltage, there is a decrease in the duration or repetition rate (or both) of the pulses from the pulse generator PG that switch Q1 into conduction. A pulse width modulator may, for example comprise a direct-potential-controlled assymmetrical astable multivibrator. A pulse frequency modulator, on the other hand, may by way of example comprise a direct-potential-controlled monostable multivibrator, or one-shot. The details of the design of the sensor VS and such multivibrators are, of course, familiar matters to those skilled in the art of switching voltage regulator design.

The nature of the switching regulation is of particular interest. The voltages developed across the windings of the flyback transformer XFR2 during flyback, when switching means SW1 is non-conductive, increase as the ratio of the conduction time of SW1 to its non-conduction time increases, due to the width or repetition rate of the pulses from modulator PG being increased, as is the general case with switching voltage regulators. This phenomenon occurs since, ignoring resistance effects, the time integral of the voltage appearing across a winding in association with building up a field surrounding it must on average equal the time integral of the voltage generated across the winding as the field is allowed to collapse. But another regulatory effect takes place owing to the primary windings of transformers XFR1 and XFR2 being selectively connected in series between terminals T1 and T2 to receive input voltage $V_{IN}$ when switching means SW1 is conductive. At that time the transformation of voltages between the windings of XFR1 reflects the output voltage $V_{OUT}$ times the turns ratio n:m back to the primary winding XFR1, to be subtracted from $V_{IN}$ to determine the primary voltage available to the flyback transformer XFR2. When $V_{OUT}$ is zero-valued, when the switching dc-to-dc converter is initially operated, transformer XFR1 in effect operates with a short-circuited secondary winding to place substantially all of $V_{IN}$ across the primary winding of flyback transformer XFR2 during the conduction of switching means SW1. As $V_{OUT}$ increases, there is a decrease in the ratio of the voltage across the primary winding of flyback transformer XFR2 to that across the primary winding of transformer XFR1 during conduction of switching means SW1, which tends to decrease the amount of energy stored each conversion cycle by flyback transformer XFR2. So, with normal output load there is a tendency towards the voltage $V_{OUT}$ assuming a value (as would be determined by the direct transformer action of XFR1 alone) of $V_{IN}$ times n/m turns ratio times the duty factor defined by the percentage of the conversion cycle that switching means SW1 is conductive. The change in the duty cycle afforded by the normal degenerative feedback provided by way of the modulator PG maintains dominant control over the regulation of $V_{OUT}$, but the tendency referred to does have an accelerative effect upon the action of the normal degenerative feedback.

Figure 2:
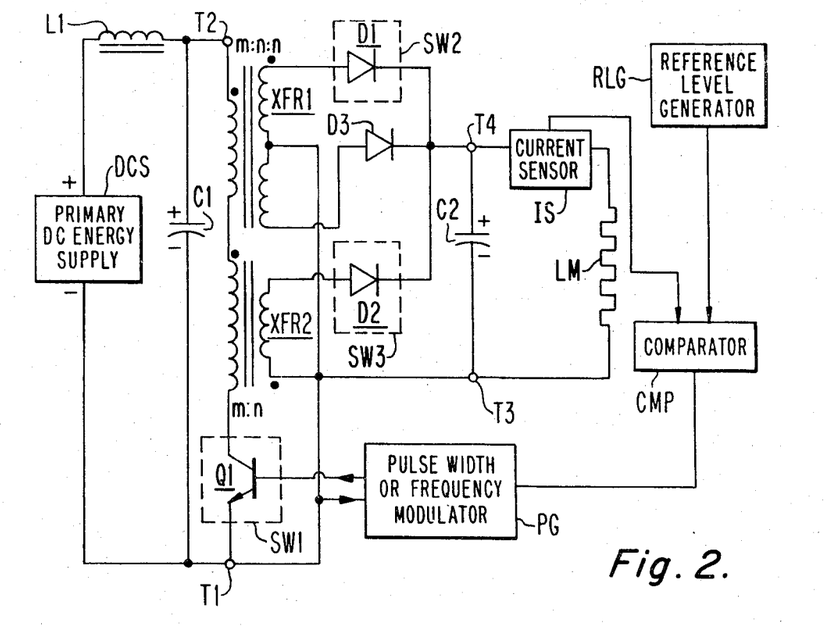
FIG. 2 is a schematic diagram of the same d-c to d-c converter shown in combination with the elements required for a switching current regulator.

FIG. 2 shows a current sensor IS arranged to respond to the flow of current in the d-c to d-c converter output for controlling the duration or repetition rate (or both) of pulses applied by a pulse generator PG to the base of Q1 to switch Q1 into conduction. Such an arrangement forms a switching current regulator. The switching of Q1 can also be controlled by controlling its base potential from a free-running pulse generator, where regulation of converter output characteristics is not of concern.

Figure 3:
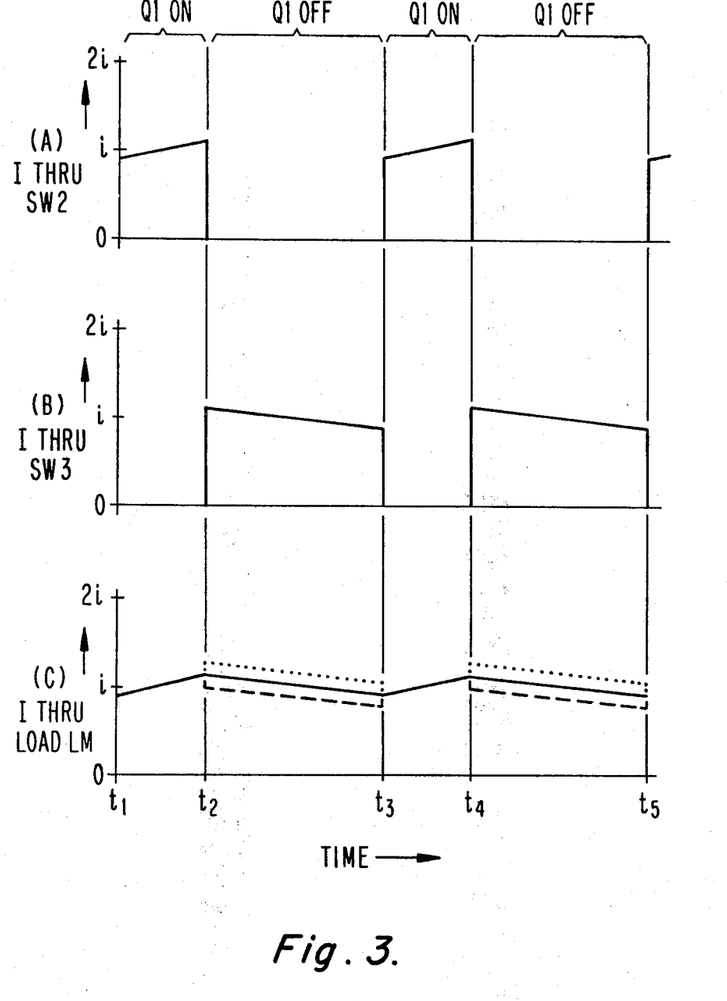
FIGS. 3A, 3B and 3C are graphs on co-extensive respective time axes of current waveforms encountered in a d-c to d-c switching converter as shown in FIG. 1.

To facilitate further analysis of the circuit operation, diode D3 will be removed to leave an open-circuit instead. Current waveforms during steady-state operation of the circuit at successive points in time $t_1$, $t_2$, $t_3$, $t_4$, $t_5$, will then resemble the ideal waveforms shown in FIGS.

3A, 3B, and 3C. The currents are expressed in "i" units where i will be shown to be the average current to load means LM. When Q1, functioning as switching means SW1, is conductive, diodes D1 and D2 are respectively conductive and non-conductive; i.e., switching means SW2 and SW3 are respectively conductive and non-conductive. The current flowing through the primary windings of transformers XFR1 and XFR2 to build up the field in transformer XFR2 is transformed in m:n ratio by transformer XFR1 to flow as a component of the current through load means LM. When Q1 is no longer conductive to provide a supply of energy to build up the field surrounding the windings of transformer XFR2, the field begins to collapse causing a tendency towards current flow in the secondary winding of a polarity to cause diode D2 to conduct. That is, switching means SW3 is rendered conductive, so the stored energy supplies a component of the current to load means LM, which is of the value shown in FIG. 3B, as the field surrounding the windings of transformer XFR2 collapses to support this current flow. The ratio of this secondary winding current at the time it starts to flow to the current in the primary winding when it ceases to flow is n:m as determined by the turns ratio between these windings. It will be appreciated then that the turns ratios between the respective primary and secondary windings of each of the transformers XFR1 and XFR2 are ideally made the same m:n value to minimize the amplitude of the ripple in the total current to the load means, so it resembles the solid line waveform of FIG. 3C. Making the turns ratio of transformer XFR2 m:n', where n exceeds n', causes departures from the solid-line waveform during non-conduction of Q1 of the sort indicated by dotted line. Making the turns ratio m:n", where m exceeds n, causes departures from the solid-line waveform during non-conduction of Q1 of the sort indicated by dashed line. The value of the ripple of the solid-line waveform can be further reduced, within practical limits, to any arbitrarily small value by increasing the self-inductance of transformer XFR2, the capacitance of smoothing capacitor C2, or both. Reconnection of the diode D3 changes the shape of the ripple somewhat, its downward slope then falling at less than linear rate.

The selection of the factor n/m, used to determine the turns ratios of the transformers XFR1 and XFR2 is made as follows. The desired direct potential output is divided by the minimum value of the direct potential available for conversion, which quotient is then divided by the maximum duty cycle afforded by the pulse generating means PG—that is by the mark-to-space ratio of the pulses supplied to switch switching means SW1 into conduction. The elements VS, RLG, CMP and PF are conventionally provided by a monolithic integrated circuit such as the SG 1524, SG 2524 or SG 3524 manufactured by Texas Instruments, Inc., Dallas, Tex. Each of these i-c's uses a pulse width modulator of the type in which the voltage to be regulated is sensed and compared to the output voltage of a sawtooth oscillator to generate pulses of a width dependent on the sensed voltage. The maximum duty cycle afforded by such apparatus has a typical value of 50%, so that n will be about twice the ratio of the desired direct potential output divided by the minimum available direct potential to be converted.

Figure 4:
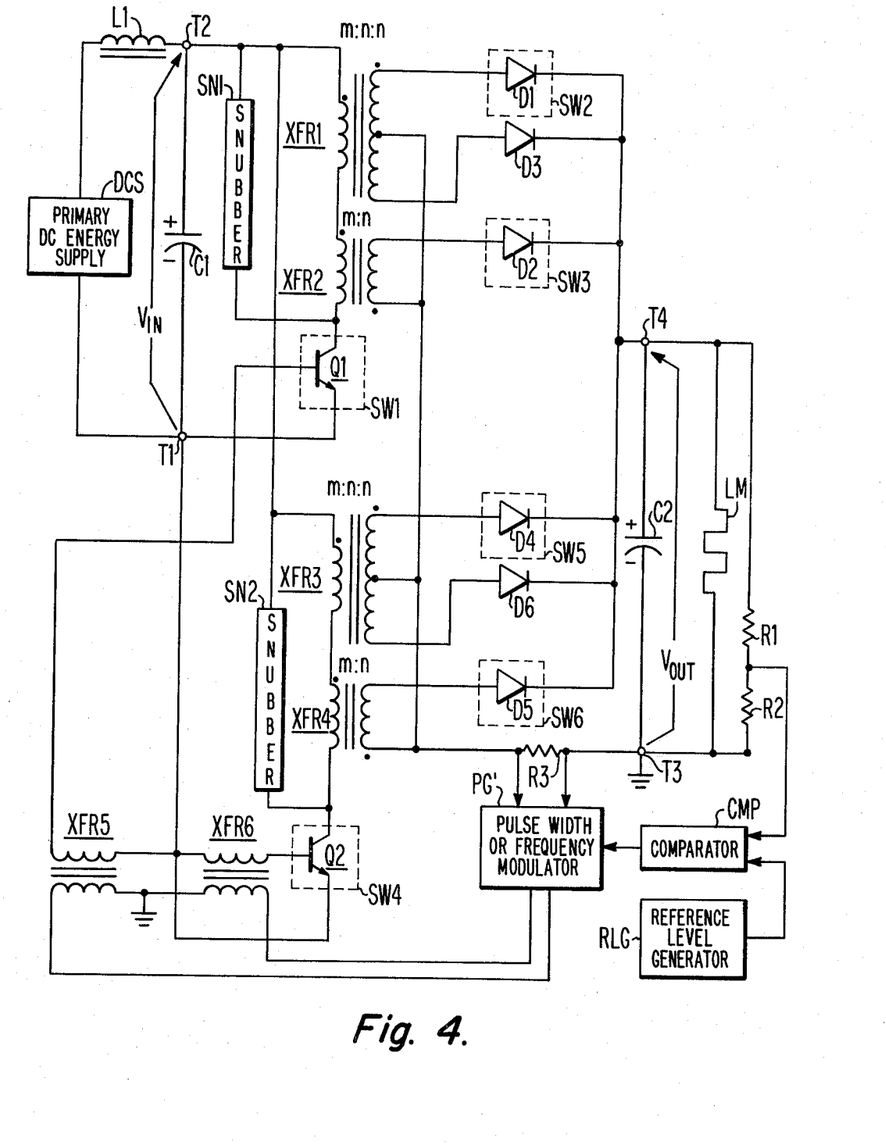
FIG. 4 is a schematic diagram of switching dc-to-dc converter embodying the present invention in comprising a pair of switching dc-to-dc converters of FIG. 1 operated in push-pull to supply converted dc to a common load means with output voltage ripple reduced in amplitude and doubled in base frequency.

In FIG. 4 a pair of switching dc-to-dc converters as thusfar described are connected with paralleled inputs and outputs and are operated in push-pull with each other. Structure comprising elements XFR1, XFR2, Q1 as SW1, D1 as SW2, D2 as SW3, and D3 is replicated in a structure comprising analogous elements transformer XFR3, transductor XFR4, transistor Q2 as switching means SW4, diode D4 as switching means SW5, diode D5 as switching means SW6, and diode D6, respectively. The locations of the snubber circuits SN1 and SN2 used to suppress excessive reverse potential on the collector-emitter circuits of transistors Q1 and Q2 are specifically shown. Voltage sensor VS is shown as specifically comprising a resistive potential divider comprising resistors R1 and R2. Resistor R3 has relatively small resistance compared to load means LM, and is used for developing a voltage drop indicative of excessive output current loading to cause pulse width or frequency modulator PG' to reduce the conduction times of Q1 and Q2 to prevent their being damaged. Pulse width or frequency modulator PG' is arranged to supply pulses alternately to the emitter-base circuit of Q1 via coupling transformer XFR5 and to the emitter-base circuit of Q2 via coupling transformer XFR6, so that push-pull operation of the two dc-to-dc converters is achieved. Both converters continuously deliver current to the common load means LM. Ideally, if the converters operate with Q1 and Q2 both conducting 50% of the time, there is no appreciable voltage ripple across capacitor C2. Practically, voltage ripple reduction is substantial even for duty cycles departing somewhat from 50%; and the fundamental frequency of the ripple cancels so that the filter specifications to suppress the ripple are less stringent.

The paralleled inputs of the converters apply more constant loading of the primary dc energy supply DCS which helps reduce output voltage ripple consequential to input voltage ripple, in addition to the ripple reduction afforded by the summation of anti-phase ripple when the converter outputs are paralleled. Alternatively, it permits the input filtering afforded by L1 and C1 to be reduced.

Interestingly, contrary to what one's natural expectations might be, the paralleling of the converter outputs does not lead to any adverse interaction between them that would interfere with both of them continuously supplying output current to load means LM. The division of the task of supplying output current to load means LM is absolutely determined with no possibility of a current-hogging condition that can overload one converter while the other is underloaded. The converter in which the switching means that selectively connects the primary windings of its transformers between terminals T1 and T2 is non-conductive appears to the other converter output circuit simply as a current source supplying a predetermined value of output current to augment its own output current. More particularly, this current source appears to be an inductor supplying flyback current, no more. The converter that appears to be a current source to the output circuit of the other is isolated at that time, insofar as a completed input circuit connection is concerned, from the primary dc energy supply DCS and input circuit filter elements L1 and C1, which avoids interfering with the input circuit of the other converter. Analogously, if one modifies the FIG. 4 configuration to include further converters for multiple phase operation—e.g., three phase operation—so long as the conduction times of the primary winding switching means do not overlap, the outputs of the converters may be directly paralleled at will without interfering with their capabilities to continuously deliver a predetermined fraction of the total output current to common load means LM. If the conduction times do overlap, however, the inductance of the flyback transformer primary windings as impedance-transformed through the conventional transformers permits their paralleling without there being interference with their simultaneously supplying respective fractions of the output current to common load means LM. The only effect that may be objectionable is that the loading on the primary energy supply DCS and its input filter L1, C1 will not be constant.

Figure 5:
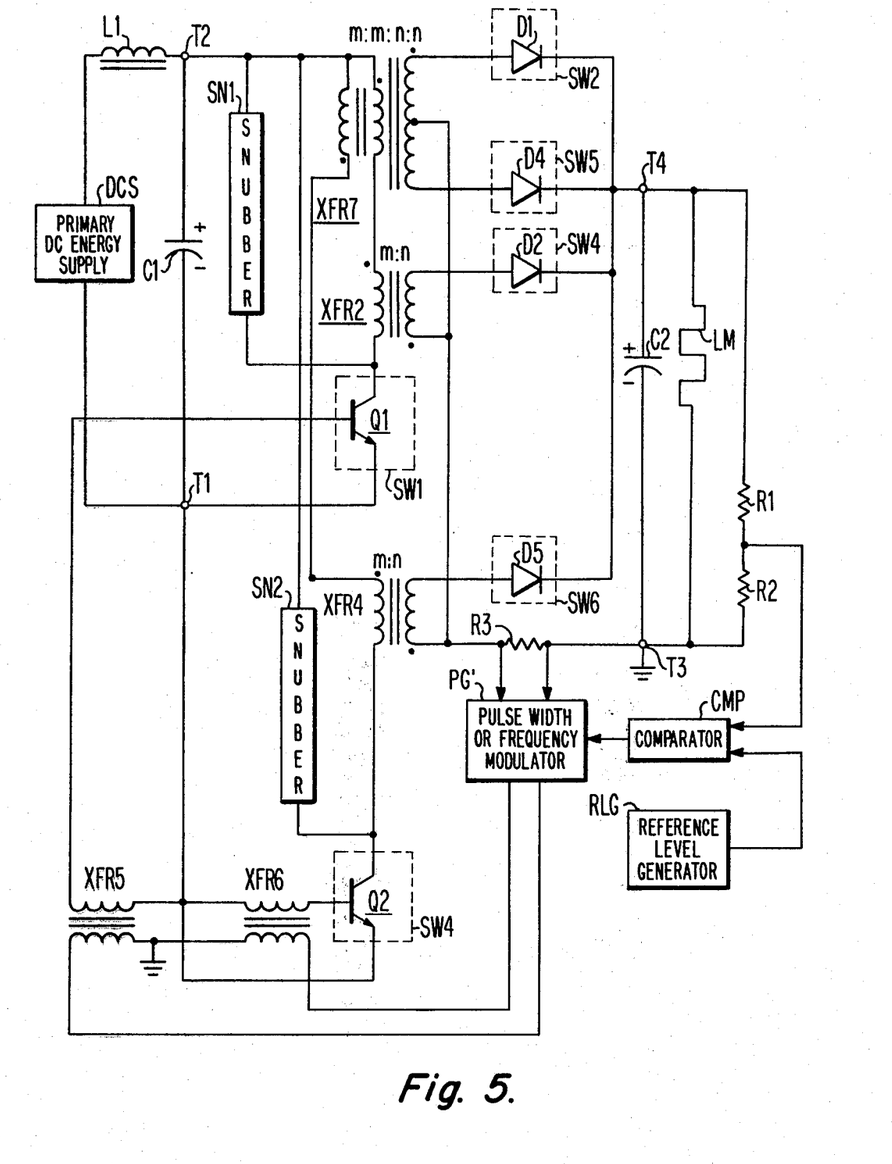
FIG. 5 is a schematic diagram of a push-pull switching dc-to-dc converter which is a modification of the FIG. 4 converter.

The FIG. 4 converter has the shortcoming that the primary windings of transformers XFR1 and XFR3 are not themselves driven push-pull which means that they must be constructed with cores such that dc magnetic saturation will not interfere with their transformer properties. The transformers XFR1 and XFR3 can be replaced in a push-pull switching dc-to-dc converter by a double-primary-winding center-tapped-secondary-winding transformer XFR7 as shown in FIG. 5. The dc magnetization components generated by the two primary windings cancel; and the diodes D3 and D6 are dispensed with as their functions are taken over by D1 and D4. (Polyphase converters with an even number of phases, pairs of which are anti-phase, can, of course, use this same scheme.) Transformer XFR7 having no resultant dc magnetization by its primary current flows can use a lighter core with a closed-loop magnetic structure, reducing its size and weight substantially.

Figure 6:
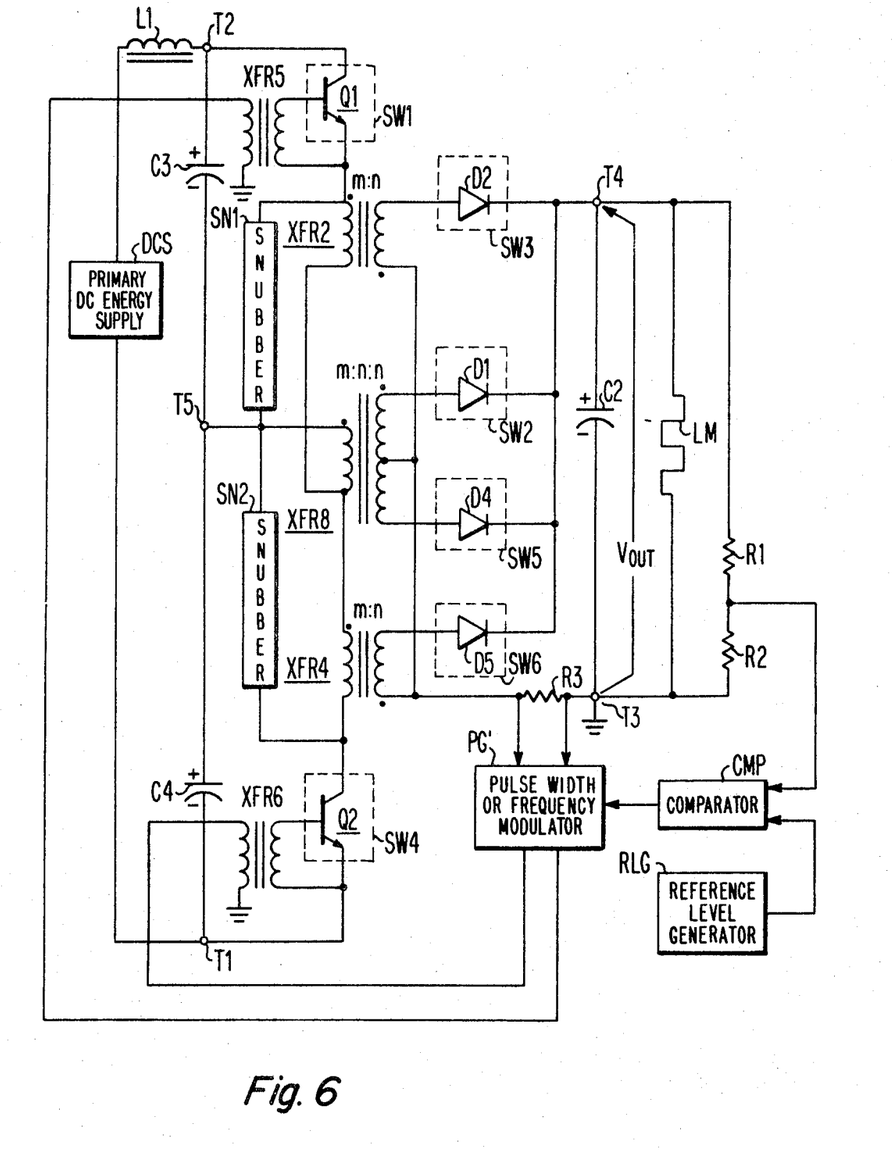
FIG. 6 is a schematic diagram of a half-bridge switching dc-to-dc converter which embodies an aspect of the invention.

FIG. 6 shows a half-bridge connection of switching dc-to-dc converters operated in push-pull, in which the two converter halves use the primary winding of the same center-tapped-secondary-winding transformer XFR8 to conduct the currents flowing when switching means SW1 and SW2 are respectively conductive, which currents are transformed by conventional transformer action in XFR8 and rectified by the diodes D1 and D4 to supply components of the output current continuously supplied to load means LM. C1 is replaced by the series connection of capacitor C3, connected between terminal T2 and a terminal T5, and a capacitor C4, connected between terminals T3 and T1. Terminal T5 has connected to it the end of the primary winding of transformer XFR1 remote from the end to which switching means SW1 and SW4 most directly connect.

Assuming the capacitances of C3 and C4 to be equal and sufficiently large to suppress ac variations about one-half the voltage $V_{IN}$ between terminals T1 and T2 will be supplied to each converter half, so the primary-to-secondary-winding turns ratio of the transformers must be made to have twice as many secondary to primary turns as in the FIGS. 4 and 5 push-pull converters in order to obtain the same $V_{OUT}$. There will, of course, be a reduction in the output voltage $V_{OUT}$ reflected back to the input circuits of the converter halves, which reduces the maximum reverse voltage requirements in the SW1 and SW4 switching devices—e.g., bipolar transistors Q1 and Q2. Since there can be no completion through capacitor C3 or C4 of a dc path through the primary winding of transformer XFR8, it can be guaranteed that no dc magnetization of that transformer will occur.

Figure 7:
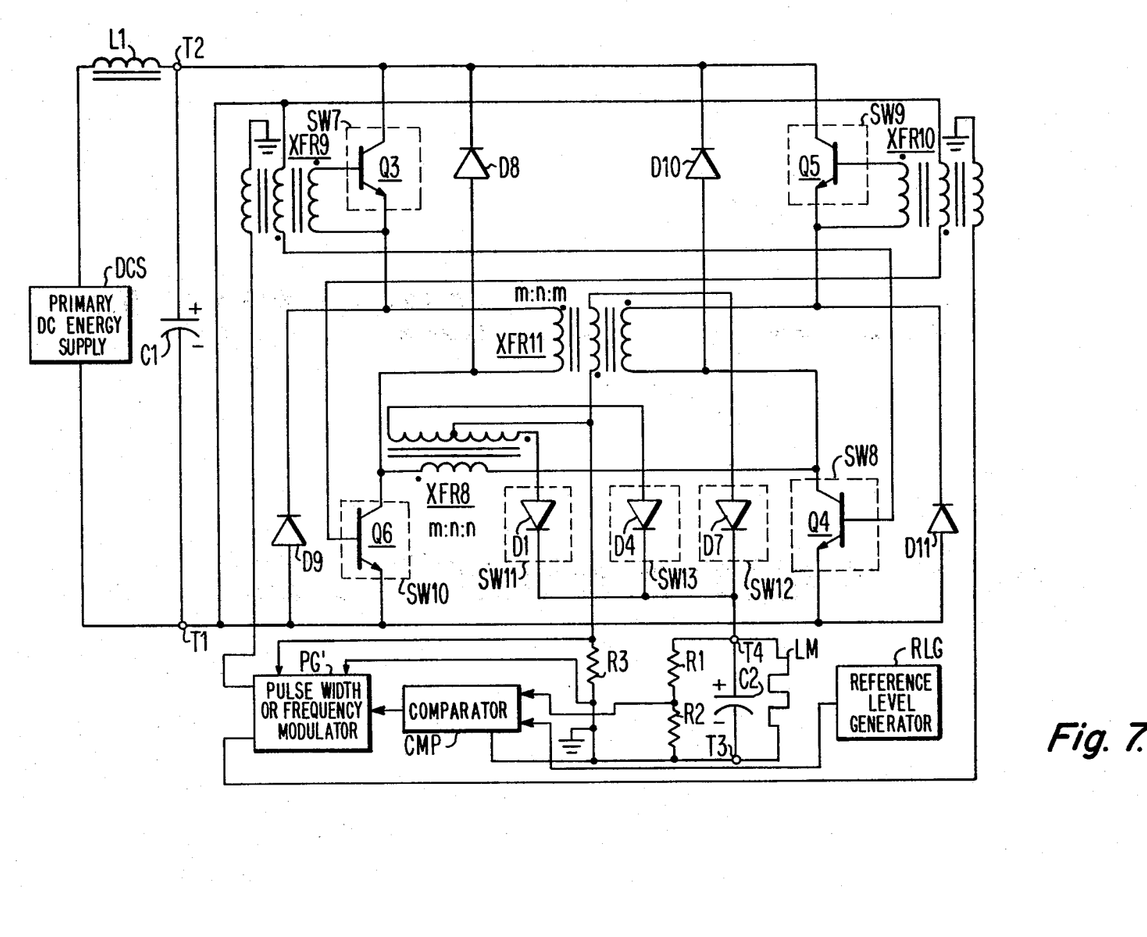
FIGS. 7 and 8 are schematic diagrams of full-bridge switching dc-to-dc converters which embody aspects of the invention.
Figure 8:
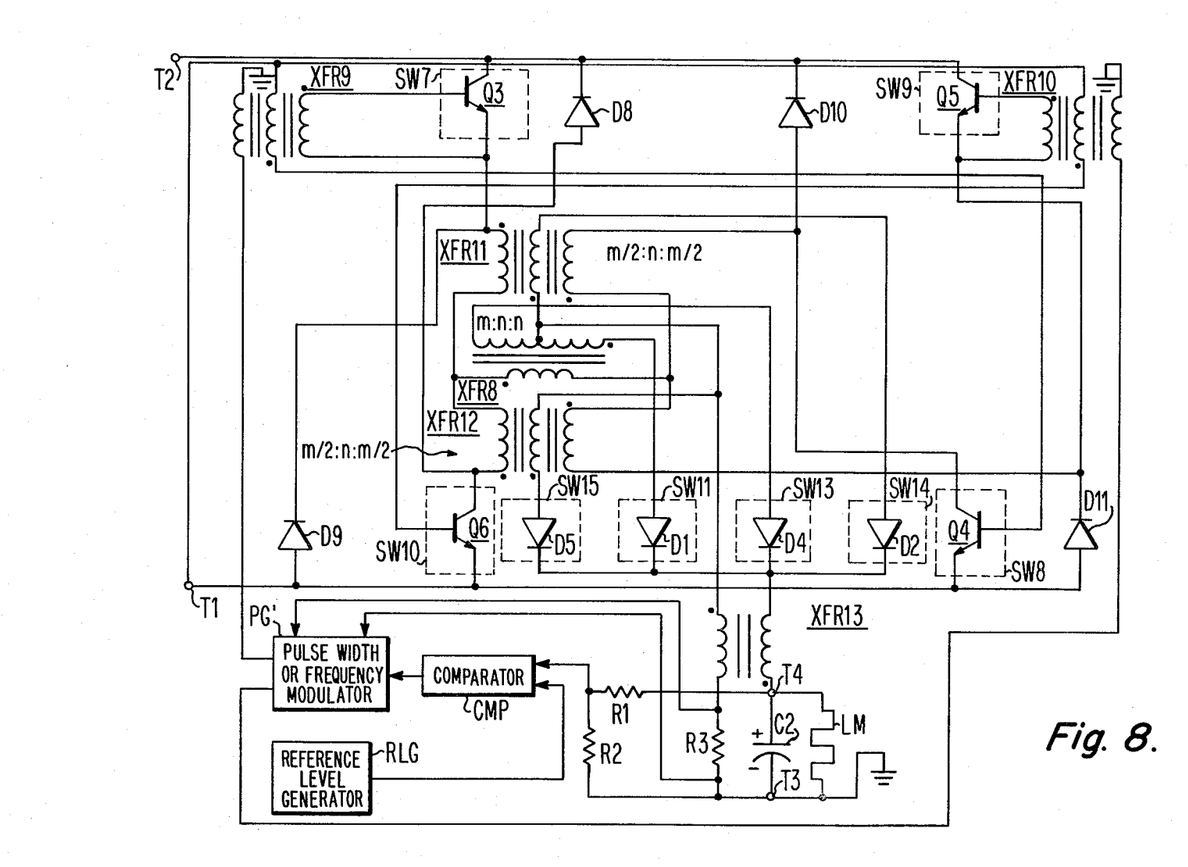

A full-bridge connection of switching means to connect first and second ends of the primary winding of transformer XFR8 to terminals T1 and T2, respectively, during alternate halves of the conversion cycle and to terminals T2 and T1, respectively, during the other halves of the conversion cycle is another stratagem that one might consider for avoiding dc magnetization of the core of transformer XFR8. FIGS. 7 and 8 show two such full-bridge connections. These connections allow the secondary-to-primary-winding turns ratio to be smaller when converting dc to high output voltages, inasmuch as the full $V_{IN}$ voltage between terminals T2 and T1 is selectively applied to the primary windings of XFR8 and the flyback transformers. In both circuits, during alternate half cycles of the conversion process, the pulse modulator PG' supplies pulses to switching devices in switching means SW7 and SW8 to render them conductive, coupling transformer XFR9 being shown as the agency for doing this. During the intervening half cycles of the conversion process, pulse modulator PG' supplies pulses to switching devices in switching means SW9 and SW10 to render them conductive, coupling transformer XFR10 being shown as the agency for this. Switches SW7, SW8, SW9 and SW10, shown as comprising NPN bipolar transistors Q3, Q4, Q5 and Q6, respectively. Of course, arrangements with all PNP bipolar transistors are possible. So are arrangements in which the transistors in switching means SW7 and SW9 are complementary to those of switching means SW8 and SW10. Field effect transistors may be used instead of bipolar transistors, as well.

In FIG. 7 a single two-primary-winding flyback transformer XFR11 is used. Each of its primary windings is in m:n turns ratio with its secondary winding, which is shown selectively connected to load means LM by conduction of diode D7. The primary winding of transformer XFR8, as in FIG. 6, is in m:n turns ratio with each of its secondary windings. The field surrounding the windings of XFR11 is built up when switching means SW7 and SW8 are conductive to connect the first of its primary windings and the primary winding of transformer XFR8 between terminals T1 and T2 during one half of each conversion cycle. The current flow through the primary winding of transformer XFR8 is transformed to flow from the one of the secondary windings of XFR8 selectively connected to load means LM by conduction of switching means SW11, which occurs simultaneously with the conduction of switching means SW7 and SW8. Switching means SW11 may simply comprise current rectifier diode D1, as shown. Thereafter, when none of switching means SW7, SW8, SW9 and SW10 is conductive to supply primary winding current to flyback transformer XFR11, the field surrounding the windings of flyback transformer XFR11 collapses, reversing the voltage induced across its secondary winding, while switching means SW12 is rendered conductive so current flows from the secondary winding of XFR11 to load means LM. Switching means SW12 may simply comprise a current rectifier D7, as shown.

Switching means SW12 is then rendered non-conductive and the field surrounding the windings of transductor XFR11 is built up again. When switching means SW9 and SW10 are conductive to connect the second of the primary windings of transformer XFR11 and the primary winding of XFR8 between terminals T1 and T2 during the other half of each conversion cycle, the current flow through the primary winding of transformer XFR8 is transformed to flow from the one of the secondary windings of XFR8 selectively connected to load means LM by conduction of switching means SW13, which occurs simultaneously with conduction of switching means SW9 and SW10. Switching means SW13 may simply comprise current rectified diode D4, as shown. Thereafter when none of switching means SW7, SW8, SW9 and SW10 is conductive to supply primary winding current to flyback transformer XFR11, the field surrounding its windings collapses. This generates a flyback current, and switching means SW12 is returned to conduction so this current flows to load means LM until switching means SW7 and SW8 are once again made conductive.

Diodes D8 and D9 conduct during transition periods to return the energy stored in the leakage inductance of the first primary winding of flyback transformer XFR11 to capacitor C1. Diodes D10 and D11 conduct during transition periods to return the energy stored in the leakage inductance of the second primary winding of flyback transformer XFR11 to capacitor C1.

FIG. 8 shows a full-bridge converter configuration in which flyback transformer XFR11 is reconnected such that the field surrounding its windings collapses during the full interval between times there is simultaneous conduction of switching means SW7 and SW8, even when switching means SW9 and SW10 are conductive. During this time switching means SW14, which may simply comprise a current rectifier diode D2, is conductive to supply flyback current to load means LM. A flyback transformer XFR12 is added and is connected such that the field surrounding its windings collapses during the full interval between times there is simultaneous conduction of switching means SW9 and SW10. During this time switching means SW15, which may simply comprise current rectifier D5, is conductive to supply flyback current to load means LM. Additional filtering against ripple is afforded by supplying current to capacitor C2 via an inductor; arranging the filter inductors as the windings of a transformer XFR13 gives a larger inductance for given number of windings on a given core.

Full-bridge converter connections are attractive where the converter output voltage is raised in value. Since the balanced drive to the converter transformer primary windings is double that available with single-ended drive, output voltage for given transformer turns ratio is doubled. In striving for higher output voltages it is convenient to use a voltage doubling connection of the converter output circuitry.

Figures 9, 10, 11:
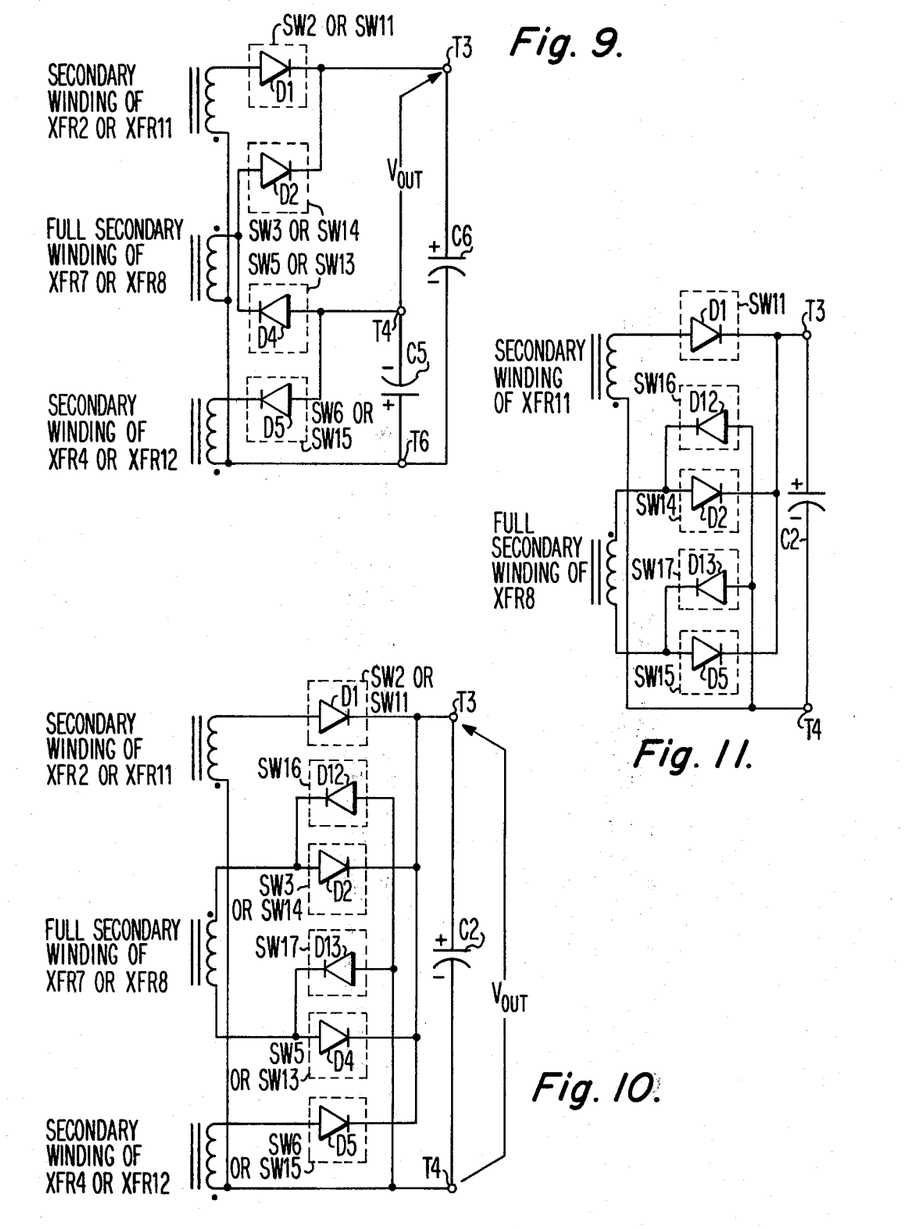
FIGS. 9 and 10 are schematic diagrams of alternative connections for rectifying converted output current components as may be used to modify the FIG. 5, 6 or 8 switching dc-to-dc converters, thus generating further embodiments of the invention.
FIG. 11 is a schematic diagram of an alternative connection for rectifying converted output current components as may be used to modify the FIG. 7 switching dc-to-dc converter, thus generating another embodiment of the invention.

FIG. 9 shows how the FIG. 5, 6 or 8 switching dc-to-dc converter can be so modified. An advantage of the FIG. 8 full-bridge converter over that of FIG. 7 is that it can be so modified since the flyback transformers provide flyback current at all times except when one pair of input switching means are conductive. Note that the transformer XFR7 of FIG. 5 or XFR8 of FIG. 6 or 8 can be replaced by a transformer with an untapped secondary winding.

An untapped secondary winding can be used in the conventional transformer even where the converter output circuitry does not employ a voltage doubler. FIG. 10 shows the form of connection required for so modifying the FIG. 5, 6 or 8 converters. Switching means SW16, as may simply consist of current rectifier diode D12, is arranged to selectively connect a first end of the secondary winding of the modified conventional transformer to terminal T4 at the same times switching means SW5 or SW13 connects the second of that secondary winding to terminal T3. Switching means SW17, as may simply consist of a current rectifier diode D13, is arranged to connect the second end of the secondary winding of the modified transformer to terminal T4 at the same times switching means SW3 or SW14 connects its first end to terminal T3. FIG. 11 shows a similar modification that can be made to the FIG. 7 converter.

One skilled in the art and armed with the foregoing disclosure will be enabled to construct many variants of the embodiments described. E.g. the switching means which comprise bipolar transistors may comprise field effect transistors instead. Accordingly the claims should be liberally construed to include such variants within their scope.

What is claimed is:

1. A switching regulator for supplying a substantially non-pulsating flow of converted current comprising:

first and second terminals for connection of a primary energy source therebetween, the voltage from which source may range between low-voltage or high-voltage conditions;

third and fourth terminals for connection of load means therebetween;

switching control means for supplying first control signal pulses and second control signal pulses interleaved in time with said first control signal pulses, with substantial intervals between each of said first control pulses and the succeeding second control pulse and between each second control pulse and the succeeding first control pulse, at least under primary energy source conditions other than said low-voltage condition, the durations of said first and second control pulses as compared to the durations of intervals between them being controllable responsive to a feedback error signal;

a first transformer having first and second primary windings and a secondary winding;

a second transformer having a primary winding with first and second ends and at least a first secondary winding;

first switching means responsive to said first control signal pulses for selectively completing a connection of the first primary winding of said first transformer between said first terminal and the first end of the primary winding of said second transformer;

second switching means responsive to said second control signal pulses for selectively completing a connection of the second primary winding of said first transformer between said first terminal and the second end of the primary winding of said second transformer;

third switching means responsive to said first control signal pulses for selectively completing a connection between the second end of the primary winding of said second transformer and said second terminal;

fourth switching means responsive to said second control signal pulses for selectively completing a connection between the first end of the primary winding of said second transformer and said second terminal;

means for supplying converted currents, all of the same polarity, from the secondary windings of said first and second transformers to said load means, one of said first and second transformers being connected for providing current during the times said control pulses are supplied and the other being connected for providing flyback current during the substantial intervals between control pulses to maintain a substantially constant flow of converted current despite non-conduction of said first, second, third and fourth switching means;

means responsive to the sum of the converted currents flowing through said load means for developing a feedback signal; and a comparator comparing said feedback signal to a reference level for developing said feedback error signal to complete a degenerative feedback loop for controlling the respective lengths of said control pulses and said substantial intervals between control pulses.

2. A switching regulator as set forth in claim 1 wherein said means for supplying converted currents, all of the same polarity, from the secondary windings of said first and second transformers comprises:

fifth switching means for selectively connecting the secondary winding of said first transformer between said third and fourth terminals at times other than when either said first or second control signal pulses are provided;

sixth switching means for selectively connecting the first secondary winding of said second transformer between said third and fourth terminals at times when said first control signal pulses are provided; and seventh switching means for selectively connecting a second secondary winding of said second transformer between said third and fourth terminals at times when said second control signal pulses are provided.

3. A switching regulator as set forth in claim 1 wherein said means for supplying converted currents, all of the same polarity, from the secondary windings of said first and second transformers comprises:

fifth switching means for selectively connecting the secondary winding of said first transformer between said third and fourth terminals at times other than when said first and second control signal pulses are provided;

sixth and seventh switching means for selectively connecting the first and second ends of the first secondary winding of said second transformer to said third terminal and to said fourth terminal, respectively, when said first control signal pulses are provided; and eighth and ninth switching means for selectively connecting the first and second ends of the first secondary winding of said second transformer to said fourth terminal and to said third terminal, respectively, when said second control signal pulses are provided.

4. A switching regulator as set forth in claim 1 including:

a third transformer having a first primary winding included in the selectively completed connection between the first end of the primary winding of said second transformer and said second terminal, having a second primary winding included in the selectively completed connection between the second end of the primary winding of said second transformer and said second terminal, and having at least a first secondary winding; and means for supplying converted current from each said at least first secondary winding of said third transformer to said load means, which current is provided to said load means in the same polarity as the converted currents supplied by said means for supplying converted currents from the secondary windings of said first and second transformers to said load means.

5. A switching regulator as set forth in claim 4 wherein said means for supplying converted currents, all of the same polarity, from the secondary windings of said first, second and third transformers comprises:

fifth switching means for selectively completing connection of the secondary winding of said first transformer between said third and fourth terminals at times other than when said first control signal pulses are provided;

sixth switching means for selectively completing connection of the secondary winding of said second transformer between said third and fourth terminals at times other than when said second control signal pulses are provided;

seventh switching means for selectively completing connection of the first secondary winding of said third transformer between said third and fourth terminals at times when said first control signal pulses are provided; and eighth switching means for selectively completing connection of a second secondary winding of said third transformer between said third and fourth terminals at times when said second control signal pulses are provided.

6. A switching regulator as set forth in claim 4 wherein said means for supplying converted currents, all of the same polarity, from the secondary windings of said first, second and third transformers comprises:

fifth switching means for selectively completing connection of the secondary winding of said first transformer between said third and fourth terminals at times other than when said first control signal pulses are provided;

sixth switching means for selectively completing connection of the secondary winding of said second transformer between said third and fourth terminals at times other than when said second control signal pulses are provided;

seventh and eighth switching means for selectively completing connection of the first and second ends, respectively, of the first secondary winding of said third transformer to said third terminal and to said fourth terminal, respectively, at times when said first control signal pulses are provided; and ninth and tenth switching means for selectively completing connection of the first and second ends, respectively, of the the secondary winding of said third transformer to said fourth terminal and to said third terminal, respectively, at times when said second control signal pulses are provided.

7. A switching regulator as set forth in claim 4 wherein said means for supplying converted currents, all of the same polarity, from the secondary windings of said first second and third transformers comprises:

first and second output filter capacitors having respective first plates connected to said third terminal and to said fourth terminal, respectively, and having respective second plates interconnected at a fifth terminal;

fifth switching means for selectively connecting the secondary winding of said first transformer between said third and fifth terminals at times other than when said first control signal pulses are provided;

sixth switching means for selectively connecting the secondary winding of said second transformer between said fourth and fifth terminals at times other than when said second control signal pulses are provided;

seventh switching means for selectively connecting the first secondary winding of said third transformer between said third and fifth terminals at times when said first control signal pulses are provided; and eighth switching means for selectively connecting the first secondary winding of said third transformer between said fourth and fifth terminals at times when said second control signal pulses are provided.

8. A switching regulator as set forth in claim 1, wherein said selectively completed connection between the second end of the primary winding of said second transformer and said second terminal is a substantially direct connection without intervening elements other than said third switching means, and wherein said selectively completed connection between the first end of the primary winding of said second transformer and said second terminal is a substantially direct connection without intervening elements other than said fourth switching means.

* * * * *